United States Patent
Kohler et al.

(10) Patent No.: US 8,699,691 B2
(45) Date of Patent: Apr. 15, 2014

(54) MULTI-TASKING RELIEF

(75) Inventors: Joylee Kohler, Northglenn, CO (US); Robert C. Steiner, Broomfield, CO (US); Andrew D. Flockhart, Thornton, CO (US)

(73) Assignee: Avaya Inc., Basking Ridge, NJ (US)

(*) Notice: Subject to any disclaimer, the term of this patent is extended or adjusted under 35 U.S.C. 154(b) by 7 days.

(21) Appl. No.: 13/449,955

(22) Filed: Apr. 18, 2012

(65) Prior Publication Data
US 2013/0279685 A1 Oct. 24, 2013

(51) Int. Cl.
*H04M 3/00* (2006.01)
*H04M 5/00* (2006.01)

(52) U.S. Cl.
USPC ............ 379/265.02; 379/265.06; 379/265.09; 379/266.1; 379/309

(58) Field of Classification Search
USPC ........ 379/265.02, 265.06, 265.09, 266.1, 309
See application file for complete search history.

(56) References Cited

U.S. PATENT DOCUMENTS

| | | | |
|---|---|---|---|
| 6,639,982 B1* | 10/2003 | Stuart et al. | 379/266.03 |
| 2003/0002653 A1* | 1/2003 | Uckun | 379/266.06 |
| 2006/0002540 A1* | 1/2006 | Kreiner et al. | 379/265.02 |
| 2007/0192414 A1* | 8/2007 | Chen et al. | 709/205 |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2011/0255683 A1 | 10/2011 | Flockhart et al. | |

* cited by examiner

*Primary Examiner* — Quynh Nguyen
(74) *Attorney, Agent, or Firm* — Sheridan Ross P.C.

(57) ABSTRACT

A contact center is described along with various methods and mechanisms for administering the same. The contact center proposed herein provides the ability to, among other things, determine performance efficiencies/metric associated with one or more multi-tasking agents and provide relief to agents based on rules. This multi-tasking relief may be provided to the one or more agents via reducing an amount of multi-tasking work, inserting breaks into the agent's work flow, and/or directing work items to other resources.

17 Claims, 5 Drawing Sheets

| Item Type | Routing Attributes | Team Attribute | Multi-Tasking Relief Attribute | Target Start And Completion Time |
|---|---|---|---|---|
| 204 | 208 | 212 | 216 | 220 |

FIG. 2

MULTI-TASKING RELIEF

FIELD OF THE DISCLOSURE

The present disclosure is generally directed toward communications and more specifically toward contact centers.

BACKGROUND

Most contact center agents are required to multi-task to maximize efficiency. In particular, a multi-tasking agent may be asked to handle multiple contacts and/or contact types simultaneously. For instance, a multi-tasking agent may be assigned both a real-time call as well as an IM chat, email, non-real-time contact, or near real-time contact.

Another type of multi-tasking scenario may not necessarily require that an agent handle two contacts at the same time, but it may require that the agent handles very different contacts back-to-back. For example, a bilingual agent may be considered to be multi-tasking if that agent is continuously moving back and forth between English work items and Spanish work items.

Unfortunately, as agents begin multi-tasking (e.g., simultaneously handling multiple contacts, contact types, or handling substantially different contacts back-to-back) they may become less efficient at handling each task. However, the overall efficiency for handling the multiple tasks (e.g., global efficiencies) may be increased. Moreover, an individual agent may not mind multi-tasking and, as in the bilingual multi-tasking example, the agent may enjoy the varied work, the agent may not be as efficient when continuously multi-tasking. As such, the decrease in an agent's efficiency due to fatigue (or other factors) may be masked by the agent's overall efficiency for handling multiple contacts.

It would be advantageous to provide a mechanism that can track a multi-tasking agent's performance (e.g., efficiency, profit/contact, customer satisfaction, etc.) and adjust the extent to which the agent is asked to multi-task based on the agent's performance. Benefits may include reducing individual agent fatigue while increasing long term agent efficiency.

SUMMARY

It is with respect to the above issues and other problems that the embodiments presented herein were contemplated. In particular, embodiments of the present disclosure provide rules to control the extent to which agents are allowed and/or required to multi-task and automated feedback mechanisms for adjusting the same.

In some embodiments, an amount of an agent's multi-tasking work may be dependent on an agent's performance over time. Specifically, an agent's performance may be observed instantaneously, and/or over a specific time period, as the agent multi-tasks. The performance observations may be recorded and/or compared to other performance metrics to gauge efficiency. Additionally or alternatively, it is anticipated that the performance observations may be used to gauge changes in an agent's efficiency. These changes may be used in determining, among other things, extrapolated predictions of efficiency, trends of efficiency, compilations of historical efficiency, and the like.

Embodiments of the present disclosure may use a plurality of different performance metrics to evaluate agent efficiency. In particular, the analysis of an agent's performance over time in comparison to one or more of these performance metrics may determine whether the agent is granted or denied multi-tasking relief. The performance metrics may include but are not limited to historical agent performance/efficiency, model agent performance/efficiency, speech analytics to determine emotion, behavior (e.g., errors made during communication), contact center rules, enterprise rules, and/or combinations thereof.

In some embodiments the present disclosure provides an agent-monitoring mechanism that compares the agent's multi-tasking performance and compares that performance to an average non-multi-tasking performance. This average non-multi-tasking performance may include historical data for a specific agent, and it may include model agent data to determine if the agent should continue multi-tasking. Further, the multi-task efficiency may be compared on a "per work item" basis. For example, where a multi-tasking agent is working on a call and an email simultaneously, the call performance may be analyzed separately from the email performance, each of which can be compared separately against the appropriate performance metrics to determine efficiency.

In some instances an agent may not be predisposed to handling multi-task work items efficiently. Whether an agent is mentally incapable of multi-tasking largely depends on personality type. Moreover, an agent's ability to multi-task may be affected by mood, health, or time of day. In any case, embodiments of the present disclosure may be utilized to determine and/or adjust the amount of multi-tasking that the agent will handle. The adjustment of multi-task work may either be a reduction in multi-tasking or a complete removal of multi-tasking for a predetermined amount of time. For example, it is anticipated that speech analytics may be used to determine whether an agent is becoming frustrated or upset, at which point, a multi-tasking relief and performance module may determine to remove multi-tasking for a certain time. Re-instatement of multi-task work to the frustrated agent may be prompted by the expiration of time and/or a sufficient change in speech analytics.

It is an aspect of the present disclosure that a reduction in multi-tasking may be media-specific and/or work item type specific. In general, each agent may have ranked preferences for different media types. In a case where Agent 1 prefers the "chat" media type to any other contact method, determined reductions to multi-tasking may remove other, less-preferred, media types first. For example, if Agent 1 prefers chat, then reduction in multi-tasking may first remove calls, then email, and then, if necessary, chat. In another example, Agent 2 is bilingual, then reduction in multi-tasking may be maintaining multi-tasking, but forcing the simultaneous work items to be in the same language. That is, Agent 2 is only asked to handle calls and chats simultaneously if they are in the same language.

In some embodiments, multi-tasking may be reduced or increased depending on the analysis of performance metrics, rules, and/or the like. For instance, an agent may be determined by the multi-tasking relief and performance module to be working very efficiently, and as a reward for the agent's high level of efficiency the multi-tasking required of that agent may be reduced. Additionally or alternatively, the same agent may be awarded with more multi-tasking work items to take advantage of the high level of efficiency as determined by rules and the multi-tasking relief and performance module.

Further, the multi-tasking relief and performance module may determine that an agent who is underperforming (i.e., demonstrating low efficiency levels when compared to the aforementioned performance metrics) may be doing so out of boredom. In other words, the agent may be exhibiting low efficiency because there are not enough multi-tasking work items in the agent's queue to offer a challenge to the agent. In this instance, the multi-tasking relief and performance module may increase the multi-tasking (by adding more multi-tasking work items) to increase the agent's efficiency.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures:

FIG. 2 is a block diagram depicting a data structure used in accordance with embodiments of the present disclosure;

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
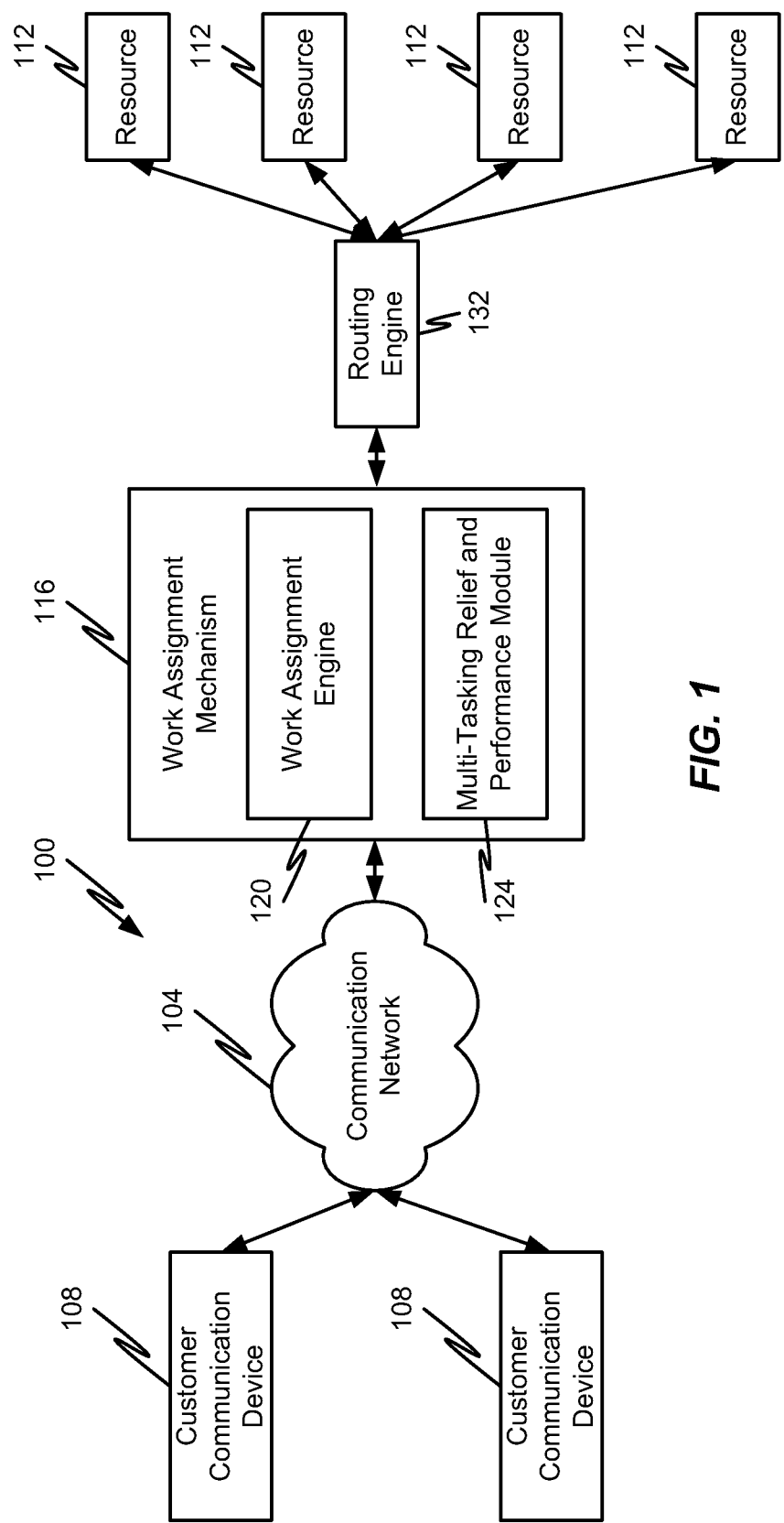
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering a contact center in which a plurality of resources 112 are distributed to handle incoming work items (in the form of contacts) from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof.

In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 1010, Feb. 17, 2010, and Feb. 17, 2010, respectively, each of which are hereby incorporated herein by reference in their entirety.

The format of the work item may depend upon the capabilities of the communication device 108 and the format of the communication. Moreover, as will be described in further detail herein, the work item may either correspond to a traditional type of work item or a break-type work item which forces the agent assigned thereto to take a break of a predetermined duration.

In some embodiments, work items are logical representations within a contact center of work to be performed in connection with servicing a communication received at the contact center (and more specifically the work assignment mechanism 116). On the other hand, break-type work items are logical representations within the contact center of a break to be taken by an agent that receives the break-type work item.

With respect to the traditional type of work item, the communication associated with a work item may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 132 to connect the communication device 108 which initiated the communication with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item (whether a work item in the traditional sense or a break-type work item) is sent toward a collection of processing resources 112 via the combined efforts of the work assignment mechanism 116 and routing engine 132. Alternatively, a break-type work item may not necessarily be routed to a resource 112, but rather may cause that resource 112 to change to a state of BUSY or UNAVAILABLE for a predetermined amount of time.

The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 is configured to administer and make work assignment decisions in a queueless contact center, as is described in U.S. patent application Ser. No. 12/882,950, the entire contents of which are hereby incorporated herein by reference.

More specifically, the work assignment engine 120 can determine which of the plurality of processing resources 112 is eligible and/or qualified to receive a work item and further determine which of the plurality of processing resources 112 is best suited to handle the processing needs of the work item (unless the assigned work item is a break-type work item in which case the determination of the best suited resource 112 corresponds to a most-deserving resource for the break). In situations of work item surplus, the work assignment engine 120 can also make the opposite determination (i.e., determine optimal assignment of a work item to a resource). In some embodiments, the work assignment engine 120 is configured to achieve true one-to-one matching.

The work assignment engine 120 may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

In addition to comprising the work assignment engine 120, the work assignment mechanism 116 may also comprise a multi-tasking relief and performance module ("multi-tasking module") 124. As discussed above, the multi-tasking module 124 may be configured to monitor and adjust work item flow for one or more resources 112 dependent on performance. In some embodiments, the multi-tasking module 124 may make adjustments based on the comparison of resource 112 performance with stored rules that govern performance, efficiency, work flow quotas, and/or the like. This comparison of performance, efficiency, and the like may use one or more algorithms that are executed by a processor to achieve their resulting data in the form of at least one performance metric. In embodiments, the monitoring of resource 112 performance may be achieved by using other features/modules located inside or outside of the work assignment mechanism 116.

FIG. 2 depicts a data structure used in accordance with embodiments of the present disclosure. Specifically, each work item may have a corresponding data structure 300 which defines the type of work item in an item type information field 204, how to route the work item in a routing attributes information field 208, whether to assign the work item to a plurality of resources in a team attribute information field 212, whether to provide multi-tasking relief in a multi-tasking relief attributes information field 216, and target service objectives in a service objective information field 220.

The item type information field 204 may comprise data that describes and/or identifies the work item media type. This field 204 may be used by the multi-tasking module 124 in determining and/or granting multi-tasking relief. For instance, a single resource 112 may be assigned multi-tasking work items, where the multi-tasking module 124 may determine a change in resource performance and may determine to adjust work flow according to work item media type. In this instance, the multi-tasking module 124 may refer to the item type information field 204 to determine how multi-tasking relief may be best applied.

In some embodiments, the item type information field 204 may comprise one or more bits which describe whether the subject work item is a traditional work item associated with a customer contact and requiring servicing by a resource 112 or whether the work item is a break-type work item. Any type of indicator, token, or descriptor may be used to indicate whether the work item is a traditional work item or a break-type work item in the item type information field 204.

The routing attributes information field 208 may comprise data that describes the attributes of a work item, regardless of whether or not the work item is a traditional work item or a break-type work item. The attributes of a work item may be in the form of one or more bits (e.g., bit values in a bitmap) indicating whether the work item has a particular attribute or not. Of course, other mechanisms of data description (e.g., strings, characters, alphanumeric values, equations, etc.) may be used to describe the attributes of a work item in the routing attributes information field 208.

The team attribute information field 212 may correspond to a separate information field as shown or it may be included in the routing attributes information field 208. In some embodiments, the team attribute information field 212 may also comprise one or more bits or bit values which identify whether a work item is to be assigned to a single resource 112 or multiple resources 112 simultaneously.

The multi-tasking relief attribute information field 216 may be similar to the team attribute information field 212 in that it too can be included in the routing attributes information field 208. In some embodiments, the multi-tasking relief attribute information field 216 may describe whether a break-type work item is to relieve an assigned resource of all work activities or only work activities for work items of a certain media type (e.g., real-time calls, real-time video calls, near-real-time Instant Message Chats, near-real-time SMS and/or MMS chats, email contacts, combinations thereof, etc.). In particular, a break-type work item may be configured to relieve a resource 112 assigned thereto of all work activities and provide a complete break from work or the break-type work item may simply provide a multi-tasking break. In the latter case, an agent may still be required to handle work items of media types other than those media types described in the multi-tasking relief attribute information field 216. It is anticipated that at least one break and/or break-type work item may be inserted into the work flow of one or more agents depending upon a number of factors, including but not limited to determining multi-tasking relief.

The service level objective information field 220 may comprise information which describes any type of service level objective or sets of objectives for work items (e.g., target start time, target completion time, maximum wait time, minimum skill requirements, duration of break time for break-type work items, etc.). It should be appreciated that the information in the service level objective information field 220 may be maintained as bit values, scalar values, or any other way of describing service level objectives for a single work item or collection of work items. In some embodiments, the multi-tasking module 124 may refer to the service level objective information field 220 in determining whether or not multi-tasking relief will be granted to a resource 112.

Figure 3:
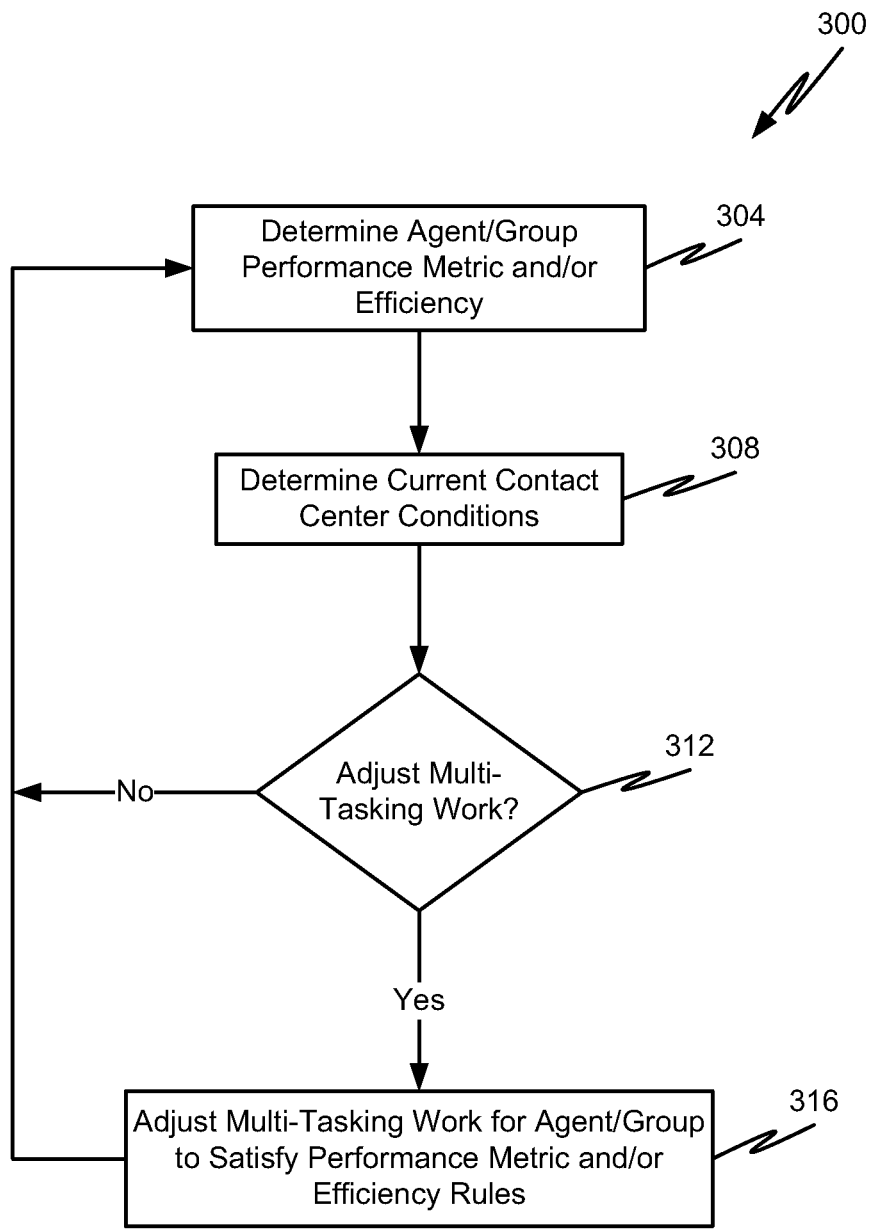
FIG. 3 is a first flow diagram depicting a method of determining multi-tasking efficiency and adjusting multi-tasking work flow in accordance with embodiments of the present disclosure.

Referring now to FIG. 3, a first flow diagram is provided in accordance with embodiments of the present disclosure depicting a method of determining multi-tasking efficiency and adjusting multi-tasking work flow. The method 300 begins by the multi-tasking module 124 determining the performance and/or efficiency of an agent/group (step 304). The performance and efficiency of one or more multi-tasking agents may be used to define at least one performance metric. The multi-tasking module 124 may determine the actual performance and/or performance metric of an agent by referring to real-time, near-real-time, and/or non-real-time data. One example of non-real-time data may include but is not limited to historical data relating to a resource. It is anticipated that the actual agent performance data and/or performance metric may be determined on-board at a contact center and/or off-board from the contact center. Additionally or alternatively, the actual agent performance data may be determined and stored as non-real-time data. This non-real-time data may be used as a baseline for the determination of resource/agent efficiency.

In some embodiments, the method 300 may determine the efficiency performance metric of an agent (step 304). The efficiency performance metric of an agent may be determined by comparing an agent's actual performance data against other data to obtain an efficiency rating. For example, the method 300 could employ a process whereby an agent's actual performance is observed and recorded over a time period and stored as historical data. This historical data may be specific to an agent's performance in handling individual and/or multi-tasked work items. Then, the historical data may be used by the multi-tasking module 124 to determine, among other things, efficiency of handling current and/or future work items, whether those work items are handled individually and/or together (i.e., multi-tasked). In other words, the multi-tasking module 124 may compare an agent's actual performance monitored in real-time, near-real-time, and/or non-real-time, with the stored historical data to determine an efficiency rating of that agent. The historical data may relate to the performance of a specific agent and may be compared to one or more other agents in order to determine an efficiency rating. In embodiments, the multi-tasking module 124 may observe that the efficiency of an agent is increasing or decreasing over time. This change in efficiency over time may provide the multi-tasking module 124 with data that can be used to establish a trend in efficiency. In response, the multi-tasking module 124 may use this trend in efficiency to adjust an amount of multi-tasking work for one or more agents.

In embodiments, the method 300 may determine at least one efficiency performance metric by using model data and/or other metrics in addition to, or apart from, the use of historical data. For instance, it may be determined that an agent, in order to be deemed efficient, must work at specific performance levels. These performance levels could be set, and stored in memory, to be used by the multi-tasking module 124 in determining an efficiency of one or more agents. For example, it may be determined that an agent is capable of handling work items at a first rate of speed per work item when working on individual work items; however the agent may be deemed capable of handling the work items at a second rate of speed when multi-tasking. The multi-tasking module 124 may use the preset first rate of speed and/or the preset second rate of speed to determine an agent's efficiency in a given scenario. Either and/or both of these preset performance levels may be determined automatically via recording performance data from one or more agents and calculating, via at least one algorithm, solved by a processor, to provide the desired performance level(s). Additionally or alternatively, the performance data may be preset as one of a plurality of constants and/or variables in the stored code of one or more algorithms.

The method 300 may determine current contact center conditions that the multi-tasking module 124 may refer to in deciding whether or not to adjust an amount of multi-tasking work (step 308). In some embodiments, it may be deemed important to adjust an amount of multi-tasking work for one or more agents based on contact center conditions. For example, in the event of an emergency, the contact center conditions surrounding the emergency may prompt the multi-tasking module 124 to adjust an amount of multi-tasking work of one or more agents to high levels to accommodate the increase in demand. Conversely, at times of low contact center traffic, the contact center conditions may prompt the multi-tasking module 124 to minimize the number of multi-tasking work items.

It should be appreciated that the scenarios described above may be altered to comport with rules and performance data. For instance, during an emergency, lowering the number of multi-tasking work may result in a more efficient handling of work items, at which point the method may adjust accordingly. Along the same lines, it may be determined that times of low contact center traffic provide better opportunities for agents to handle larger multi-tasking work. In any of the aforementioned scenarios, the determination of contact center conditions may be used in adjusting multi-tasking (step 308).

At step 312 the multi-tasking module 124 may make the determination of whether to adjust an amount of multi-tasking work for one or more agents. As described above, the adjustment determination may be made automatically, in response to contact center conditions, in response to rules governing agent efficiency, contractual obligations, regulations, and/or other performance metrics. In one embodiment, the regulations may be imposed by contract, law, enterprise policy, or combinations thereof. The multi-tasking module 124 may refer to rules stored in memory to govern the decision of adjusting an amount of multi-tasking. The rules may comprise data that relates to one or more agent's performance and/or efficiency. Additionally or alternatively, the rules may comprise data relating to contact center conditions. It is anticipated that a rule may alter the determination of at least one performance metric associated with one or more multi-tasking agents. This altered performance metric may be used to adjust the amount of multi-tasking work for the one or more agents. It is an aspect of the present disclosure that the rule may even be a single event such as getting a "perfect" quality score or reaching a revenue target. Additionally or alternatively, the rule may be used by one or more individuals (e.g., management, administration, supervisors, and the like) to intervene with the adjustment of multi-tasking work.

It is an aspect of the present disclosure that the multi-tasking module 124 may be configured to receive input from one or more individuals regarding adjustment of the amount of multi-tasking. Alternatively, the amount multi-tasking may be adjusted by one or more individuals directly. In some embodiments, the adjustments made by one or more individuals, whether made via the multi-tasking module 124 or made directly, may be capable of overriding the existing multi-tasking work and/or relief of at least one agent. By way of example, an administrator or manager of at least one agent may decide to intervene in the assignment of work and/or multi-tasking relief and provide multi-tasking relief or additional multi-tasking work to the at least one agent.

The multi-tasking module 124 may decide to adjust the amount of multi-tasking work for an agent based on the efficiency and/or performance metric of an agent, as determined in step 304. For example, the multi-tasking module 124 may make use of an agent's trend in efficiency as a prompt to adjust an amount of multi-tasking work. As another example, the efficiency rating of an agent may be used to determine if preset service levels are being met. If the service levels are not being met, the multi-tasking module 124 may determine to adjust the amount of multi-tasking work for that agent accordingly. Conversely, if the service levels are being met by the agent, the multi-tasking module 124 may determine to adjust the amount of multi-tasking work by granting multi-tasking relief to the agent. Additionally or alternatively, the multi-tasking module 124 may decide to make no changes to the amount of multi-tasking work. In the event that the multi-tasking module 124 determines not to adjust the amount of multi-tasking work for one or more agents, the method continues at step 304. However, in the event that the multi-tasking module 124 determines to adjust the amount of multi-tasking work the method continues at step 316.

Once the multi-tasking module 124 has made a determination to adjust the amount of multi-tasking work for one or more agents (in step 312), the multi-tasking module 124 may work in conjunction with the work assignment engine 120 and/or the routing engine 132 to effect the adjustment (step 316). In one embodiment, the multi-tasking module 124 may send a command to the work assignment engine 120 to effect the adjustment. As previously stated, the adjustment may include but is not limited to adding, removing, and/or changing the amount of multi-tasking work that an agent is handling. In some instances, all multi-tasking work items may be removed from an agent's work flow. This complete removal of multi-tasking work may be made in response to a determination by the multi-tasking module 124 that an agent is not performing up to preset minimum standards and/or a service level criterion (e.g., indicating a greater problem). In other instances, it may be observed that an agent is performing at high levels of efficiency, or a high performance metric, which could cause the multi-tasking module 124 to either reduce the number of multi-task work items (e.g., as a break-type reward) or increase the number of multi-task work items to take advantage of the highly efficient agent. Once the amount of multi-tasking work has been adjusted, the method may return to step 304 and the process can begin anew.

Figure 4:
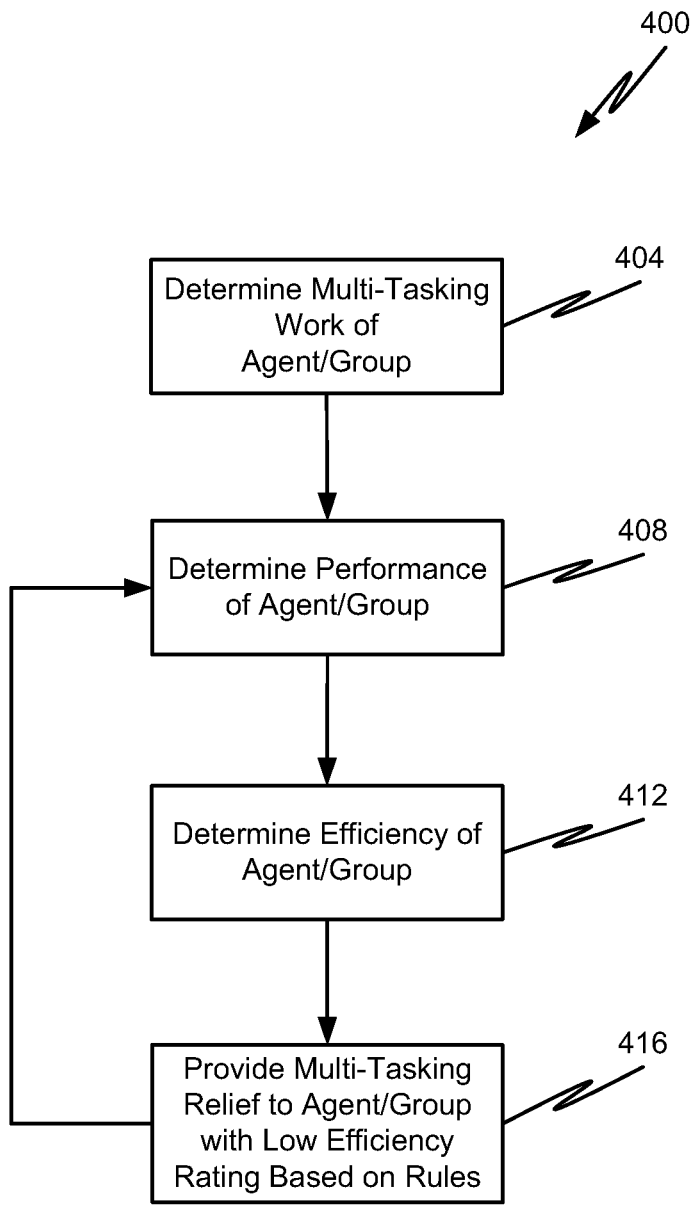
FIG. 4 is a second flow diagram depicting a method of determining multi-tasking efficiency and adjusting multi-tasking work flow in accordance with embodiments of the present disclosure.

FIG. 4 is a second flow diagram depicting a method of determining multi-tasking efficiency and adjusting an amount of multi-tasking work in accordance with embodiments of the present disclosure. The method is initiated when the multi-tasking module 124 determines the multi-tasking items of an agent or plurality of agents (step 404). In step 404, the multi-tasking module 124 may not only determine which agent or agents are engaged in handling multi-tasking work, but it may also determine the specific media types of work items and/or the number of work items that one or more individual agents are handling. By determining the specific media types of work items that an agent is multi-tasking, the multi-tasking module 124 can precisely determine an agent's efficiency and/or performance metric. Additionally or alternatively, the multi-tasking module 124 may use the specific media types of work items as possible targets for multi-tasking work adjustment (described in step 416 below).

The method 400 continues where the multi-tasking module 124 determines the performance of an agent or group of agents (step 408). The multi-tasking module 124 may determine the actual performance and/or a performance metric of an agent by referring to real-time, near-real-time, and/or non-real-time data. As described above, an example of non-real-time data may include but is not limited to historical data relating to a resource. It is anticipated that the actual agent performance data may be determined on-board at a contact center and/or off-board from the contact center. Additionally or alternatively, the actual agent performance data may be determined and stored as non-real-time data. For example, the multi-tasking module 124 may determine the changing performance of at least one agent by monitoring and recording multiple performance characteristics over time. Using the changing performance of an agent, the multi-tasking module 124 can determine a trend in an agent's performance or performance metric. Trend data, real-time data, near-real-time data, and/or non-real-time data may be used to determine agent efficiency.

The multi-tasking module 124 may determine the efficiency of an agent by comparing the agent's actual performance data against other data to obtain an efficiency indicator (step 412). This efficiency may be known as a performance metric. It is an aspect of the present disclosure that the multi-tasking module 124 could make determinations of an agent's efficiency over time to establish a trend in efficiency. Upward trends in efficiency may indicate that an agent is coping well with assigned multi-tasking work items. In contrast, downward trends in an agent's efficiency may indicate that an agent is having difficulty coping with assigned multi-task work items. There may be instances where an agent's trend in efficiency neither increases nor decreases. Such trends may indicate that an agent is meeting the demands of assigned multi-tasking. In any event, the efficiency trend data may be used by the multi-tasking module 124 in determining adjustments to assigned multi-tasking work items. It is yet another aspect of the present disclosure that efficiency may be determined as described above with respect to step 304 of method 300.

In the event that an agent is determined to have a low efficiency indication/rating, the multi-tasking module 124 may offer the agent multi-tasking relief by adjusting the amount of assigned multi-tasking work (step 416). Specifically, multi-tasking relief may be provided by the multi-tasking module 124 reducing and/or changing an agent's assigned multi-tasking work items. It can be appreciated that some instances may require that the amount of multi-tasking work assigned to an agent be reduced to zero. In other words, an agent's efficiency level may be so low that the agent is deemed incapable of handling any multi-tasking work items.

As previously described, the multi-tasking module 124 may change an agent's amount of assigned multi-tasking work in response to determining a low efficiency rating. For example, a bi-lingual agent may be handling calls from English speakers and Spanish speakers back-to-back. Although not necessarily occurring at the same time, handling this type of work item (and continuous switching) may be considered multi-tasking. In response to a low efficiency indication, the bi-lingual agent may be offered multi-tasking relief by the multi-tasking module 124. The multi-tasking relief may be in the form of changing the multi-task work items of an agent to include only the same language work item types for a specific period of time. Additionally or alternatively, the agent may be granted multi-tasking relief until the multi-tasking module 124 determines that the agent's efficiency has reached a specific level. The multi-tasking module 124 may refer to stored preferences in determining which changes may be appropriate to effect.

In embodiments, including but not limited to those previously disclosed, the multi-tasking module 124 may refer to stored preferences when determining the adjustment of multi-tasking work. Specifically, an agent may prefer one work item to another when multi-tasking and/or handling single work items. It is also anticipated that an agent may prefer to handle specific combinations of work items. Moreover, one or more agents may demonstrate a preference and/or efficiency when handling a particular work item type and/or combination of work item types. Although an agent may not be aware of these preferences, the agent may exhibit higher efficiencies when dealing with a certain work item. These higher efficiencies can be determined, and even recorded, by the multi-tasking module 124. Whether their preferences of an agent are determined and/or input into stored memory, the multi-tasking module 124 may refer to these stored preferences.

In one exemplary embodiment (step 416), the multi-tasking module 124 may determine that an agent's efficiency has dropped to a low rating. The low rating/indication may be predetermined and input into memory as a threshold. It is anticipated that the threshold could be a standard for a given agent, group, and/or contact center. Although the threshold could be set as a standard, they may be customized per agent, group, and/or contact center. It is further anticipated that standard thresholds could be set for some, while customized thresholds could be set for others. Upon determining a low efficiency rating, the multi-tasking module 124 may adjust the amount of multi-tasking work to offer multi-tasking relief to the agent. As stated above, this relief may include reducing and/or changing the multi-tasking work items that an agent is handling and/or will handle.

Using the stored preferences, the multi-tasking module 124 may reduce multi-tasking work that an agent considers unfavorable and/or exhibits low efficiency handling levels. For example, if an agent's stored preferences suggest higher efficiencies are attainable when the agent handles call work items and email work items together, the multi-tasking module 124 may offer multi-tasking relief by reducing/removing the number of work items that are not call or email related.

The multi-tasking module 124 may use the stored preferences to change the multi-tasking work items to a preferred work type. This latter adjustment would be ideally suited for the bi-lingual agent who prefers to work in one language over another. In some embodiments, the multi-tasking module 124 may reduce/remove all of the work items completely from an agent's work flow. Removing all of the multi-tasking work items from an agent's work flow may be made in response to the agent's efficiency levels dropping to extreme lows. The extreme low threshold may be set and/or determined in a similar manner to the low rating threshold mentioned above. Further, if an agent's efficiency drops to an extremely low threshold it may indicate a greater problem with the agent. For instance, the agent may be absent, sleep deprived, suffering health issues, and/or other conditions. It is anticipated that an alert may be issued in response to this extremely low threshold being crossed by one or more agents.

Figure 5:
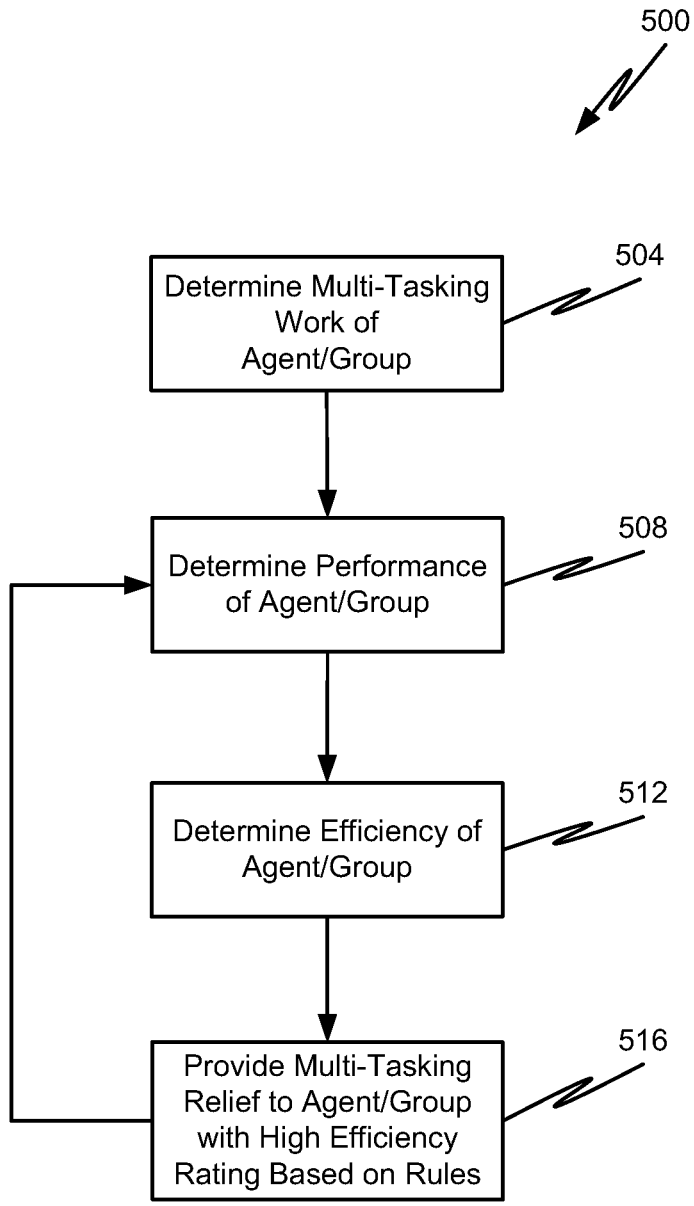
FIG. 5 is a third flow diagram depicting a method of determining multi-tasking efficiency and adjusting multi-tasking work flow in accordance with embodiments of the present disclosure.

With reference to FIG. 5, a third flow diagram depicting a method of determining multi-tasking efficiency and adjusting multi-tasking work flow in accordance with embodiments of the present disclosure. The method is initiated when the multi-tasking module 124 determines the multi-tasking items of an agent or plurality of agents (step 504). In step 504, the multi-tasking module 124 may not only determine which agent or agents are engaged in handling multi-tasking work items, but it may also determine the specific media types of work items and/or the number of work items that one or more individual agents are handling. By determining the specific media types of work items that an agent is multi-tasking, the multi-tasking module 124 can precisely determine an agent's efficiency. Additionally or alternatively, the multi-tasking module 124 may use the specific media types of work items as possible targets for multi-tasking adjustment (described in step 516 below).

The method 500 continues where the multi-tasking module 124 determines the performance of an agent or group of agents (step 508). The multi-tasking module 124 may determine the actual performance of an agent by referring to real-time, near-real-time, and/or non-real-time data. As described above, an example of non-real-time data may include but is not limited to historical data relating to a resource. It is anticipated that the actual agent performance data may be determined on-board at a contact center and/or off-board from the contact center. Additionally or alternatively, the actual agent performance data may be determined and stored as non-real-time data. For example, the multi-tasking module 124 may determine the changing performance of at least one agent by monitoring and recording multiple performance characteristics over time. Using the changing performance of an agent, the multi-tasking module 124 can determine a trend in an agent's performance. Trend data, real-time data, near-real-time data, and/or non-real-time data may be used to determine agent efficiency.

The multi-tasking module 124 may determine the efficiency of an agent by comparing the agent's actual performance data against other data to obtain an efficiency indicator (step 512). This efficiency may be known as a performance metric. It is an aspect of the present disclosure that the multi-tasking module 124 could make determinations of an agent's efficiency over time to establish a trend in efficiency. Upward trends in efficiency may indicate that an agent is coping well with assigned multi-tasking work items. In contrast, downward trends in an agent's efficiency may indicate that an agent is having difficulty coping with assigned multi-task work items. There may be instances where an agent's trend in efficiency neither increases nor decreases. Such trends may indicate that an agent is meeting the demands of assigned multi-tasking. In any event, the efficiency trend data may be used by the multi-tasking module 124 in determining adjustments to an amount of multi-tasking work. It is yet another aspect of the present disclosure that efficiency may be determined as described above with respect to step 304 of method 300.

In the event that an agent is determined to have a low efficiency indication/rating, the multi-tasking module 124 may offer the agent multi-tasking relief by adjusting the assigned multi-tasking work items (step 516). Specifically, multi-tasking relief may be provided by the multi-tasking module 124 reducing and/or changing an agent's assigned multi-tasking work items. It can be appreciated that some instances may require that an amount of multi-tasking work assigned to an agent be reduced to zero. In other words, an agent may exhibit high efficiency levels and, as a reward, the agent may be granted multi-tasking relief in the form of a reduced/changed work load and/or break-type work item.

As previously described, the multi-tasking module 124 may change an amount of an agent's multi-tasking work in response to determining a high efficiency rating. For example, a bi-lingual agent may be handling calls from English speakers and Spanish speakers back-to-back. Although not necessarily occurring at the same time, handling this type of work item (and continuous switching) may be considered multi-tasking. In response to a high efficiency indication, the bi-lingual agent may be offered multi-tasking relief by the multi-tasking module 124. The multi-tasking relief may be in the form of changing the multi-task work items of an agent to include only the same language work item types for a specific period of time. Additionally or alternatively, the agent may be granted multi-tasking relief until the multi-tasking module 124 determines that the agent's efficiency has reached a specific level. The multi-tasking module 124 may refer to stored preferences in determining which changes may be appropriate to effect. It is anticipated that the agent may be offered relief from multi-tasking altogether. In some cases, the agent will be offered multi-tasking relief by receiving a break inserted by the multi-tasking module 124. This break may be inserted in the form of a break-type work item and/or alert.

In embodiments, including but not limited to those previously disclosed, the multi-tasking module 124 may refer to stored preferences when determining the adjustment of an amount of multi-tasking work. Specifically, an agent may prefer one work item to another when multi-tasking and/or handling single work items. It is also anticipated that an agent may prefer to handle specific combinations of work items. Moreover, one or more agents may demonstrate a preference and/or efficiency when handling a particular work item type and/or combination of work item types. Although an agent may not be aware of these preferences, the agent may exhibit higher efficiencies when dealing with a certain work item. These higher efficiencies can be determined, and even recorded, by the multi-tasking module 124. Whether their preferences of an agent are determined and/or input into stored memory, the multi-tasking module 124 may refer to these stored preferences.

In one exemplary embodiment (step 516), the multi-tasking module 124 may determine that an agent is handling an amount of multi-tasking work at a high efficiency level. This high efficiency level or rating/indication may be predetermined and input into memory as a threshold. It is anticipated that the threshold could be a standard for a given agent, group, and/or contact center. Although the threshold could be set as a standard, they may be customized per agent, group, and/or contact center. It is further anticipated that standard thresholds could be set for some, while customized thresholds could be set for others. Upon determining a high efficiency rating, the multi-tasking module 124 may adjust an amount of multi-tasking work to offer multi-tasking relief to the agent as a reward for the increased efficiency. As stated above, this relief may include reducing and/or changing and amount of multi-tasking work that an agent is handling and/or will handle.

Using the stored preferences, the multi-tasking module 124 may reduce an amount of multi-tasking work that an agent considers unfavorable and/or exhibits low efficiency handling levels. For example, if an agent's stored preferences suggest higher efficiencies are attainable when the agent handles call work items and email work items together, the multi-tasking module 124 may offer multi-tasking relief by reducing/removing the number of work items that are not call or email related. By determining the efficiency of a specific type or combination of types of work items an agent may be allowed the opportunity to work on preferred work items, even if those preferences are unknown to the agent.

The multi-tasking module 124 may use the stored preferences to change an amount of multi-tasking work to a preferred work type. This latter adjustment would be ideally suited for the bi-lingual agent who prefers to work in one language over another. In some embodiments, the multi-tasking module 124 may reduce/remove all of the work items completely from an agent's work flow. Removing all of the multi-tasking work items from an agent's work flow may be made in response to the agent's efficiency levels reaching an extreme high. The extreme high threshold may be set and/or determined in a similar manner to the high rating threshold mentioned above. Further, if an agent's efficiency reaches an extremely high threshold it may indicate that the agent and/or contact center could benefit from increased training in other areas. For instance, the agent may be considered an expert in several different work item types. Once the agent reaches extremely high thresholds of efficiency in those different work item types, the agent may be introduced to training opportunities to expand the agent's repertoire. The agent may be provided with other opportunities as a reward for reaching high efficiency ratings including but not limited to company recognition, salary increases, promotion, increased work item preference control, and/or the like. It is anticipated that an alert may be issued in response to this extremely high threshold being crossed by one or more agents.

It should be appreciated that while embodiments of the present disclosure have been described in connection with a queueless contact center architecture, embodiments of the present disclosure are not so limited. In particular, those skilled in the contact center arts will appreciate that some or all of the concepts described herein may be utilized in a queue-based contact center or any other traditional contact center architecture.

Furthermore, in the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
   determining, by a processor, at least one performance metric associated with one or more multi-tasking agents in a contact center, wherein the at least one performance metric is determined by comparing historical performance data, associated with the one or more multi-tasking agents, with at least one service level criterion;
   determining, by the processor, that a change in the at least one performance metric corresponds to at least one specific work item type that is handled as part of multi-tasking work by the one or more multi-tasking agents; and
   adjusting an amount of the at least one specific work item type in the multi-tasking work for the one or more multi-tasking agents based on the determined change in the at least one performance metric, wherein adjusting the amount of the at least one specific work item type in the multi-tasking work further comprises:
   referring to adjustment rules, wherein the adjustment rules define one or more of a work item and a work item type to adjust for the one or more multi-tasking agents based on the determined change in the at least one performance metric; and sending a command to adjust the amount of the at least one specific work item type in the multi-tasking work for the one or more multi-tasking agents based on the adjustment rules.

2. The method of claim 1, wherein the determination of the at least one performance metric is altered by one or more of a rule and regulation.

3. The method of claim 1, wherein the historical performance data is obtained in at least one of real-time, near-real-time, and non-real-time.

4. The method of claim 1, wherein the amount of the at least one specific work item type in the multi-tasking work is adjusted by at least one of reducing and increasing a number of work items assigned to the one or more multi-tasking agents.

5. The method of claim 2, wherein the amount of the at least one specific work item type in the multi-tasking work is adjusted by at least one of reducing and increasing a number of work item types assigned to the one or more multi-tasking agents.

6. The method of claim 1, wherein multi-tasking relief is granted as part of the adjustment step by reducing the amount of the at least one specific work item type in the multi-tasking work for the one or more multi-tasking agents for a predetermined amount of time.

7. The method of claim 6, wherein the multi-tasking relief is granted in response to determining that historical performance data associated with the one or more multi-tasking agents does not meet at least one service level criterion.

8. The method of claim 6, wherein the multi-tasking relief is granted in response to determining that historical performance data associated with the one or more multi-tasking agents meets or exceeds at least one service level criterion.

9. The method of claim 6, wherein the multi-tasking relief is granted by inserting one or more of a break and break-type work item into at least one work flow associated with the one or more multi-tasking agents.

10. The method of claim 6, wherein the multi-tasking relief is granted by marking an availability, associated with the one or more multi-tasking agents, as busy.

11. A non-transitory computer readable medium having stored thereon instructions that, when executed by a processor, perform a method comprising:

determining, by a processor, at least one performance metric associated with one or more multi-tasking agents in a contact center, wherein the at least one performance metric is determined by comparing historical performance data, associated with the one or more multi-tasking agents, with at least one service level criterion;

determining, by the processor, that a change in the at least one performance metric corresponds to at least one specific work item type that is handled as part of multi-tasking work by the one or more multi-tasking agents; and adjusting an amount of the at least one specific work item type in the multi-tasking work for the one or more multi-tasking agents based on the determined change in the at least one performance metric, wherein adjusting the amount of the at least one specific work item type in the multi-tasking work further comprises:

referring to adjustment rules, wherein the adjustment rules define one or more of a work item and a work item type to adjust for the one or more multi-tasking agents based on the determined change in the at least one performance metric; and sending a command to adjust the amount of the at least one specific work item type in the multi-tasking work for the one or more multi-tasking agents based on the adjustment rules.

12. The non-transitory computer readable medium of claim 11, wherein multi-tasking relief is granted as part of the adjustment step by reducing the amount of the at least one specific work item type in the multi-tasking work for the one or more multi-tasking agents for a predetermined amount of time.

13. The non-transitory computer readable medium of claim 12, wherein the multi-tasking relief is granted in response to determining that historical performance data associated with the one or more multi-tasking agents does not meet at least one service level criterion.

14. The non-transitory computer readable medium of claim 12, wherein the multi-tasking relief is granted in response to determining that historical performance data associated with the one or more multi-tasking agents meets or exceeds at least one service level criterion.

15. A contact center, comprising:
a memory;
a processor; and
a work assignment mechanism including:
    a work assignment engine configured to compare attributes of work items in a work pool with attributes of resources in a resource pool and match the work items to the resources based on the comparison of attributes; and
    a multi-tasking module configured to determine at least one performance metric associated with one or more multi-tasking agents in a contact center, wherein the at least one performance metric is determined by comparing historical performance data, associated with the one or more multi-tasking agents, with at least one service level criterion; determine that a change in the at least one performance metric corresponds to at least one specific work item type that is handled as part of multi-tasking work by the one or more multi-tasking agents; and command the work assignment engine to adjust an amount of the at least one specific work item type in the multi-tasking work for the one or more multi-tasking agents based on the determined change in the at least one performance metric, and wherein the work assignment mechanism is further configured to refer to adjustment rules, wherein the adjustment rules define one or more of a work item and a work item type to adjust for the one or more multi-tasking agents based on the determined change in the at least one performance metric; and send a command to the work assignment engine, wherein the work assignment engine is configured to adjust the amount of the at least one specific work item type in the multi-tasking work for the one or more multi-tasking agents based on the adjustment rules.

16. The contact center of claim 15, wherein the work assignment engine is further configured to adjust the amount of the at least one specific work item type in the multi-tasking work by reducing the number of work items assigned to the one or more multi-tasking agents.

17. The contact center of claim 15, wherein the work assignment engine is further configured to adjust the amount of the at least one specific work item type in the multi-tasking work by increasing the number of work item types assigned to the one or more multi-tasking agents.

\* \* \* \* \*